(12) United States Patent
Gornard et al.

(10) Patent No.: US 11,254,804 B2
(45) Date of Patent: Feb. 22, 2022

(54) TIRE HAVING A COMPOSITION COMPRISING AN ETHYLENE-RICH ELASTOMER, A PEROXIDE AND A ZINC ACRYLATE

(71) Applicant: COMPAGNIE GENERALE DES ETABLISSEMENTS MICHELIN, Clermont-Ferrand (FR)

(72) Inventors: Benjamin Gornard, Clermont-Ferrand (FR); Didier Vasseur, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 298 days.

(21) Appl. No.: 16/491,790

(22) PCT Filed: Mar. 8, 2018

(86) PCT No.: PCT/FR2018/050538
§ 371 (c)(1),
(2) Date: Sep. 6, 2019

(87) PCT Pub. No.: WO2018/162854
PCT Pub. Date: Sep. 13, 2018

(65) Prior Publication Data
US 2020/0040166 A1    Feb. 6, 2020

(30) Foreign Application Priority Data
Mar. 8, 2017   (FR) ...................................... 1751891

(51) Int. Cl.
| | | |
|---|---|---|
| *C08L 9/00* | (2006.01) | |
| *C08K 5/098* | (2006.01) | |
| *B60C 1/00* | (2006.01) | |
| *C08K 5/14* | (2006.01) | |
| *C08K 3/04* | (2006.01) | |

(52) U.S. Cl.
CPC .............. *C08L 9/00* (2013.01); *B60C 1/0016* (2013.01); *B60C 1/0041* (2013.01); *C08K 5/098* (2013.01); *C08K 5/14* (2013.01); *C08K 3/04* (2013.01)

(58) Field of Classification Search
None
See application file for complete search history.

(56) References Cited

U.S. PATENT DOCUMENTS

| | | | |
|---|---|---|---|
| 5,227,425 A | 7/1993 | Rauline | |
| 5,852,099 A | 12/1998 | Vanel | |
| 5,900,449 A | 5/1999 | Custodero et al. | |
| 6,310,164 B1 | 10/2001 | Morizono et al. | |
| 6,420,488 B1 | 7/2002 | Penot | |
| 6,536,492 B2 | 3/2003 | Vasseur | |
| 6,569,799 B1 | 5/2003 | Barbotin et al. | |
| 6,610,261 B1 | 8/2003 | Custodero et al. | |
| 6,747,087 B2 | 6/2004 | Custodero et al. | |
| 6,774,255 B1 | 8/2004 | Tardivat et al. | |
| 6,800,705 B2 | 10/2004 | Barbotin et al. | |
| 6,849,754 B2 | 2/2005 | Deschler et al. | |
| 7,094,854 B2 | 8/2006 | Monteil et al. | |
| 7,217,751 B2 | 5/2007 | Durel et al. | |
| 7,250,463 B2 | 7/2007 | Durel et al. | |
| 7,488,768 B2 | 2/2009 | Tardivat et al. | |
| 7,547,654 B2 | 6/2009 | Boisson et al. | |
| 7,820,771 B2 | 10/2010 | Lapra et al. | |
| 8,039,565 B2 | 10/2011 | Boisson et al. | |
| 8,071,700 B2 | 12/2011 | Thuilliez et al. | |
| 8,071,800 B2 | 12/2011 | Thuilliez et al. | |
| 8,268,949 B2 | 9/2012 | Thuilliez et al. | |
| 8,461,269 B2 | 6/2013 | Varagniat et al. | |
| 8,492,475 B2 | 7/2013 | Araujo Da Silva et al. | |
| 8,492,573 B2 | 7/2013 | Thuilliez et al. | |
| 8,883,929 B2 | 11/2014 | Gandon-Pain et al. | |
| 8,957,155 B2 | 2/2015 | Seeboth et al. | |
| 9,010,393 B2 | 4/2015 | Araujo Da Silva et al. | |
| 9,309,388 B2 | 4/2016 | Okada et al. | |
| 9,718,309 B2 * | 8/2017 | Vasseur ................... C08K 3/04 |

(Continued)

FOREIGN PATENT DOCUMENTS

| | | |
|---|---|---|
| CN | 104311983 A | 1/2015 |
| EP | 0 390 012 A1 | 10/1990 |

(Continued)

OTHER PUBLICATIONS

Google scholar search (Year: 2021).*
International Search Report dated Apr. 30, 2018, in corresponding PCT/FR2018/050538 (6 pages).
S. Brunauer et al., "Adsorption of Gases in Multimolecular Layers", J. Am. Chem. Soc., vol. 60, pp. 309-319 (1938).
M.F. Llauro et al., "Investigation of Ethylene/Butadiene Copolymers Microstructure by 1H and 13C NMR", Macromolecules 2001, 34, 6304-6311.
XP002775661, Thomson Scientific, Database WPI Week 201529, London, GB, AN 2015-18826D (corresponding to CN104311983).

*Primary Examiner* — Peter A Salamon
(74) *Attorney, Agent, or Firm* — Venable LLP

(57) ABSTRACT

A tire with improved wear resistance, rolling resistance and cohesion, comprises a rubber composition based on at least one elastomeric matrix comprising predominantly a random copolymer comprising ethylene units and conjugated diene units, the mole fraction of ethylene units in the copolymer being within a range extending from 50% to 95%; a peroxide; and a zinc diacrylate derivative in the form of a specific zinc salt; in which composition the contents of zinc diacrylate derivative and of peroxide being such that the ratio of the peroxide content to the zinc diacrylate derivative content is greater than or equal to 0.08; said composition comprising from 5 to less than 65 phr of reinforcing filler; the ratio of the filler content to the zinc diacrylate derivative content being greater than or equal to 1.25.

19 Claims, No Drawings

(56) References Cited

U.S. PATENT DOCUMENTS

| | | |
|---|---|---|
| 10,301,455 B2 | 5/2019 | Vasseur |
| 2001/0034389 A1 | 10/2001 | Vasseur |
| 2003/0004287 A1 | 1/2003 | Barbotin et al. |
| 2003/0065076 A1* | 4/2003 | Hellens .................... C08K 5/14 524/397 |
| 2004/0051210 A1 | 3/2004 | Tardivat et al. |
| 2004/0132880 A1 | 7/2004 | Durel et al. |
| 2004/0142066 A1* | 7/2004 | Andersen ................ A23G 4/06 426/3 |
| 2005/0004297 A1 | 1/2005 | Durel et al. |
| 2005/0084638 A1* | 4/2005 | Kerstetter, III ........ B29D 22/00 428/36.1 |
| 2005/0239639 A1 | 10/2005 | Monteil et al. |
| 2005/0247391 A1 | 11/2005 | Ikuta |
| 2006/0160969 A1 | 7/2006 | Boisson et al. |
| 2008/0132644 A1 | 6/2008 | Lapra et al. |
| 2008/0319125 A1 | 12/2008 | Boswell et al. |
| 2009/0182104 A1 | 7/2009 | Thuilliez et al. |
| 2009/0186961 A1 | 7/2009 | Araujo Da Silva et al. |
| 2009/0194225 A1 | 8/2009 | Ikuta |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-pain et al. |
| 2009/0270578 A1 | 10/2009 | Boisson et al. |
| 2010/0022714 A1 | 1/2010 | Varagniat et al. |
| 2010/0022725 A1* | 1/2010 | Thuilliez ................ C07F 17/00 526/134 |
| 2010/0145089 A1 | 6/2010 | Mignani et al. |
| 2010/0216935 A1 | 8/2010 | Boswell et al. |
| 2010/0282383 A1 | 11/2010 | Ikuta |
| 2011/0021702 A1 | 1/2011 | Gandon-Pain et al. |
| 2011/0152458 A1 | 6/2011 | Araujo Da Silva et al. |
| 2011/0294953 A1 | 12/2011 | Seeboth et al. |
| 2011/0319646 A1 | 12/2011 | Boswell et al. |
| 2012/0142905 A1 | 6/2012 | Thuilliez et al. |
| 2012/0165492 A1 | 6/2012 | Thuilliez et al. |
| 2012/0208948 A1 | 8/2012 | Gandon-Pain et al. |
| 2013/0324657 A1 | 12/2013 | Okada et al. |
| 2015/0291782 A1* | 10/2015 | Feldhues ................ C08L 21/00 523/156 |
| 2016/0243896 A1 | 8/2016 | Vasseur et al. |
| 2017/0349728 A1* | 12/2017 | Nayrat .................... C08K 5/14 |
| 2017/0349731 A1* | 12/2017 | Vasseur .................. C08K 5/103 |
| 2018/0050566 A1* | 2/2018 | Vasseur .................... C08L 9/00 |
| 2020/0040166 A1* | 2/2020 | Gornard ................ B60C 1/0016 |
| 2021/0130578 A1 | 5/2021 | Gornard et al. |

FOREIGN PATENT DOCUMENTS

| | | |
|---|---|---|
| EP | 0501227 A1 | 9/1992 |
| EP | 0735088 A1 | 10/1996 |
| EP | 0810258 A1 | 12/1997 |
| EP | 1092731 A1 | 4/2001 |
| EP | 1552965 A1 | 7/2005 |
| EP | 1554321 A1 | 7/2005 |
| EP | 1656400 A1 | 5/2006 |
| EP | 1829901 A2 | 9/2007 |
| EP | 1954705 A2 | 8/2008 |
| EP | 1957506 A2 | 8/2008 |
| EP | 2676994 A1 | 12/2013 |
| FR | 3030543 A1 | 6/2016 |
| WO | 97/36724 A2 | 10/1997 |
| WO | 99/09036 A1 | 2/1999 |
| WO | 99/16600 A1 | 4/1999 |
| WO | 00/05300 A1 | 2/2000 |
| WO | 00/05301 A1 | 2/2000 |
| WO | 02/30939 A1 | 4/2002 |
| WO | 02/31041 A1 | 4/2002 |
| WO | 02/083782 A1 | 10/2002 |
| WO | 02/096677 A1 | 12/2002 |
| WO | 03/016387 A1 | 2/2003 |
| WO | 2006/023815 A1 | 3/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2007/054224 A2 | 5/2007 |
| WO | 2007/061550 A1 | 5/2007 |
| WO | 2007/098080 A2 | 8/2007 |
| WO | 2008/003434 A1 | 1/2008 |
| WO | 2008/003435 A1 | 1/2008 |
| WO | 2008/055986 A2 | 5/2008 |
| WO | 2010/072685 A1 | 7/2010 |
| WO | 2015/059167 A1 | 4/2015 |
| WO | 2016/102480 A1 | 6/2016 |
| WO | 2016/102483 A1 | 6/2016 |
| WO | 2016/139285 A1 | 9/2016 |

* cited by examiner

TIRE HAVING A COMPOSITION COMPRISING AN ETHYLENE-RICH ELASTOMER, A PEROXIDE AND A ZINC ACRYLATE

BACKGROUND

The invention relates to tires and more particularly to those in which the composition of the tread or that of an inner layer comprises a zinc diacrylate derivative and a peroxide.

Tire layers such as the tread or the inner layers must comply with a large number of technical, often antinomic, requirements including low rolling resistance, high wear resistance, good road behaviour, and also a good level of cohesion of the material.

Tire designers are constantly looking for a solution to change the existing property compromise by improving at least one property of the tire, without however penalizing others.

It is known that to improve wear resistance a certain stiffness of the tread is desirable, which stiffening of the tread may be obtained for example by increasing the content of reinforcing filler or by incorporating certain reinforcing resins into the rubber compositions making up these treads. Unfortunately, experience shows that such stiffening of the tread can decrease, in a known manner, the rolling resistance properties, accompanied by a significant increase in hysteretic losses of the rubber composition. Consequently, improving the stiffness performance while maintaining low rolling resistance is a problem that tire designers have to solve.

From the point of view of the rolling resistance, this compromise of properties could be improved thanks to the use of new mixtures having good mechanical properties and a hysteresis as low as possible in order to be able to use them in the form of rubber compositions that can be used for the manufacture of various semi-finished products used in the composition of tires. For example, documents WO 2015/059167 and WO 2016/139285 propose to use a zinc diacrylate derivative and a peroxide in diene elastomer-based compositions.

Thus, manufacturers are still looking for ways to further improve both wear resistance and rolling resistance.

It is in this context that the Applicant has surprisingly discovered that the wear resistance can be very significantly improved and the hysteresis can also be reduced in tire rubber compositions, with a reduced content of reinforcing filler, by virtue of the combined use of an elastomeric matrix based on a copolymer comprising from 50 to 95 mol % of ethylene units and conjugated diene units, and a crosslinking system based on a zinc diacrylate derivative and a peroxide, with the proviso of adopting a suitable peroxide content to zinc diacrylate derivative content ratio.

Moreover, this solution has many other advantages over the compositions of the prior art and in particular an improvement in the drift thrust and therefore in the road behaviour, and also an improvement in the cohesion of the material.

SUMMARY

Thus, a subject of the present invention is in particular a tire comprising a rubber composition based on at least:
an elastomeric matrix comprising predominantly a random copolymer comprising ethylene units and conjugated diene units, the mole fraction of the ethylene units in the copolymer being within a range extending from 50% to 95%,
a peroxide, and
a zinc diacrylate derivative in the form of a zinc salt of formula (I)

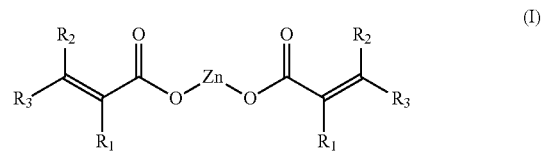

in which $R_1$, $R_2$ and $R_3$ represent independently of one another a hydrogen atom or a $C_1$-$C_7$ hydrocarbon-based group selected from linear, branched or cyclic alkyl groups, aralkyl groups, alkylaryl groups and aryl groups, and optionally interrupted by one or more heteroatoms, $R_2$ and $R_3$ possibly together forming a non-aromatic ring,
the contents of zinc diacrylate derivative and of peroxide being such that the ratio of the peroxide content to the zinc diacrylate derivative content is greater than or equal to 0.08; said composition comprising from 5 to less than 65 phr of reinforcing filler; the ratio of the filler content to the zinc diacrylate derivative content being greater than or equal to 1.25.

I—DEFINITIONS

The expression "part by weight per hundred parts by weight of elastomer" (or phr) should be understood as meaning, within the meaning of the present invention, the part by weight per hundred parts by weight of elastomer or rubber.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

In the present document, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof. By way of example, a composition based on an elastomeric matrix and on sulfur comprises the elastomeric matrix and the sulfur before curing, whereas, after curing, the sulfur is no longer detectable as the latter has reacted with the elastomeric matrix with the formation of sulfur (polysulfide, disulfide, monosulfide) bridges.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight, relative to the total weight of the compound type. Thus, for example, a predominant reinforcing filler is the reinforcing filler representing the greatest weight relative to the total weight of the reinforcing fillers in the composition. On the contrary, a "minor" compound is a compound which does not represent the greatest fraction by weight among the compounds of the same type.

Within the context of the invention, the carbon products mentioned in the description may be of fossil or biosbased origin. In the latter case, they may partially or completely result from biomass or be obtained from renewable starting materials resulting from biomass. Polymers, plasticizers, fillers, and the like, are concerned in particular.

II—DESCRIPTION OF THE INVENTION

II-1 Elastomeric Matrix

The composition of the tire according to the invention has the essential characteristic of comprising an elastomeric matrix comprising predominantly a random copolymer comprising ethylene units and conjugated diene units (also referred to herein as "the copolymer"), the mole fraction of the ethylene units in the copolymer being within a range extending from 50% to 95%.

According to the invention, the conjugated diene units are preferably selected from the group consisting of butadiene units, isoprene units and mixtures of these conjugated diene units. More preferably, the conjugated diene units are predominantly, or even preferentially exclusively, butadiene units.

Advantageously, the microstructure of the copolymer is homogeneous. A copolymer is of homogeneous microstructure when, for each of these units, at each instant of polymerization, the concentrations in the chain are identical or virtually identical. Thus, for each of these units, at a given instant, the concentration is identical or virtually identical to its concentration at the instant just before and after, and thus at any instant of the polymerization. For the purposes of the present invention, in the expression "the concentration is identical or virtually identical to", the term "virtually identical" is intended to mean a variation of less than 2 mol %.

In particular, in the random copolymer comprising ethylene units and conjugated diene units, the molar concentration in each of these units is constant all along the copolymer chain. Thus, for a representative number of successive units defining a segment, present at the beginning, middle or end or at any other place of the chain of the copolymer, the concentration of ethylene units and conjugated diene units is identical or virtually identical in each segment. A sequence of 10 units may be a representative number.

Advantageously, the concentration of ethylene units and conjugated diene units (preferably butadiene units) is identical or virtually identical all along the copolymer chain. It will be possible to determine the concentration of each of the units in advance according to the nature of the catalytic system selected and to the operating conditions (monomer concentrations and pressure in particular).

Advantageously, the mole fraction of the ethylene units in the copolymer is within a range extending from 50% to 95%, preferably from 65% to 85%, preferably from 65% to 80%.

The mole fraction of conjugated diene units (preferably butadiene units) in the copolymer is less than or equal to 50%. Preferably, it is within a range extending from 10% to 50%, preferably from 15% to 35%, preferably from 20% to 35%.

According to the invention, the random copolymer comprising ethylene units and conjugated diene units may comprise trans-1,2-cyclohexane units. When the copolymer comprises trans-1,2-cyclohexane units, the mole fraction of trans-1,2-cyclohexane units in the copolymer is preferably between 0% and 25%, preferably from 1% to 10%, more preferably from 1% to 5%.

According to the invention, the random copolymer comprising ethylene units and conjugated diene units may comprise vinylaromatic units. By way of vinylaromatic unit, the following are suitable for example: styrene, ortho-, meta-, or para-methylstirene, the commercially sold mixture "vinyl toluene", para-tert-butylstirene, methoxystirenes, chlorostirenes, vinylmesitylene, divinylbenzene, vinylnaphthalene. Advantageously, the random copolymer comprising ethylene units and conjugated diene units does not comprise a vinylaromatic unit.

Advantageously, the random copolymer comprising ethylene units and conjugated diene units has a weight Mn ranging from 20 000 g/mol to 1 500 000 g/mol, more preferentially ranging from 60 000 g/mol to 250 000 g/mol.

Advantageously also, the random copolymer comprising ethylene units and conjugated diene units has a polydispersity index which is less than 2.5. Preferably, the PDI index of said copolymers is less than or equal to 2 and, even more preferentially, this PDI index is less than or equal to 1.9. As with the molecular weights Mn, the polydispersity indices PDI were determined in the present application by size exclusion chromatography.

Advantageously also, the random copolymer comprising ethylene units and conjugated diene units has a glass transition temperature Tg which is less than 25° C. More specifically, these copolymers may for example have a temperature Tg of between −45° C. and −20° C.

Advantageously also, when the random copolymer comprising ethylene units and conjugated diene units additionally comprises trans-1,2-cyclohexane units, the copolymer has a crystallinity of less than 25%, more advantageously less than 15%, and even more advantageously less than 10%.

The techniques used for the determination of the mole fractions, molecular weights, glass transition temperatures and crystallinity are described hereinafter in the examples.

The random copolymers comprising ethylene units and conjugated diene units that can be used in the context of the present invention may be obtained according to known synthesis methods, in particular those described in documents EP 1 092 731, EP 1 554 321, EP 1 656 400, EP 1 829 901, EP 1 954 705 and EP 1 957 506, or in French patent applications 15/62573 and 15/62575 filed 17 Dec. 2015 with the Institut Nationale de la Propriété Industrielle (INPI) [French Patent Office] in France.

According to the invention, advantageously, the elastomeric matrix comprises only, as elastomer, the random copolymer comprising ethylene units and conjugated diene units.

Alternatively, the elastomeric matrix may also comprise a diene elastomer other than the random copolymer comprising ethylene units and conjugated diene units (also referred to herein as "the other elastomer"). The other elastomer, when it is present, is a minority, that is to say that it represents less than 50%, 40%, 30%, 20% or even less than 10% by weight of the elastomeric matrix.

The other elastomer of the elastomeric matrix of the tire according to the invention is preferentially selected from the group of highly unsaturated diene elastomers consisting of polybutadienes (abbreviated to "BRs"), synthetic polyisoprenes (IRs), natural rubber (NR), butadiene copolymers, isoprene copolymers and mixtures of these elastomers. Such copolymers are more preferentially selected from the group consisting of butadiene/stirene copolymers (SBRs), isoprene/butadiene copolymers (BIRs), isoprene/stirene copolymers (SIRs), isoprene/butadiene/stirene copolymers (SBIRs), butadiene/acrylonitrile copolymers (NBRs), butadiene/stirene/acrylonitrile copolymers (NSBRs) or a mixture of two or more of these compounds.

II-2 Zinc Diacrylate Derivative

The composition of the tire according to the invention is based on a zinc diacrylate derivative in the form of a zinc salt of formula (I)

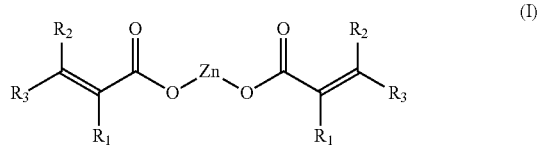

in which $R_1$, $R_2$ and $R_3$ independently represent a hydrogen atom or a $C_1$-$C_7$ hydrocarbon-based group selected from linear, branched or cyclic alkyl groups, aralkyl groups, alkylaryl groups and aryl groups, and optionally interrupted by one or more heteroatoms, $R_2$ and $R_3$ possibly together forming a non-aromatic ring.

Cyclic alkyl group is understood to mean an alkyl group comprising one or more rings.

Hydrocarbon-based group or chain interrupted by one or more heteroatoms is understood to mean a group or chain comprising one or more heteroatoms, each heteroatom being between two carbon atoms of said group or said chain or between a carbon atom of said group or said chain and another heteroatom of said group or said chain or between two other heteroatoms of said group or said chain. The heteroatom or heteroatoms can be a nitrogen, sulfur or oxygen atom.

Preferentially, $R_1$, $R_2$ and $R_3$ independently represent a hydrogen atom or a methyl group. More preferentially, $R_2$ and $R_3$ each represent a hydrogen atom. More preferably still, $R_1$ represents a methyl group. Yet more advantageously, $R_2$ and $R_3$ each represent a hydrogen atom, and $R_1$ represents a methyl group.

In the rubber composition of the tire according to the invention, the amount of zinc diacrylate derivative is preferably within a range extending from 5 to 40 phr, preferably from 5 to 30 phr, preferably from 5 to 20 phr, preferably from 5 to 10 phr. Above a content of 40 phr, the dispersion is poorer and the properties of the composition may deteriorate, whereas, below a content of 5 phr, the effect of the zinc diacrylate derivative is less noteworthy with regard to the stiffening and the reinforcing.

By way of example, zinc diacrylate derivatives such as zinc diacrylate (ZDA) Dimalink 633 from the company Cray Valley or zinc dimethacrylate (ZDMA) Dimalink 634 from the company Cray Valley are commercially available.

II-3 Peroxide

In addition to the above-described elastomeric matrix and zinc diacrylate derivative, the rubber composition of the tire of the invention uses a peroxide, which may be any peroxide known to those skilled in the art.

Among the peroxides, which are well known to those skilled in the art, it is preferable to use, for the invention, a peroxide selected from the family of the organic peroxides. Preferably, the organic peroxide is selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis (tert-butylperoxy)-2,5-dimethylhexane, n-butyl-4,4'-di(tert-butylperoxy) valerate, OO-(t-butyl)-O-(2-ethylhexyl) monoperoxycarbonate, tert-butyl peroxyisopropylcarbonate, tert-butyl peroxybenzoate, tert-butyl peroxy-3,5,5-trimethylhexanoate, 1,3 (4)-bis(tert-butylperoxyisopropyl)benzene, and mixtures thereof. Alternatively, the peroxide may be an organic peroxide selected from the group comprising or consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis (tert-butylperoxy)-2,5-dimethylhexane and mixtures thereof.

Various packaged products, known under their trade names, are available commercially; mention may be made of Dicup from Hercules Powder Co., Perkadox Y12 from Noury van der Lande, Peroximon F40 from Montecatini Edison S.p.A., Trigonox from Noury van der Lande, Varox from R.T.Vanderbilt Co. or else Luperko from Wallace & Tiernan Inc.

Preferentially, the amount of peroxide to be used for the requirements of the invention is less than or equal to 3 phr. Preferably, the amount of peroxide in the composition is within a range extending from 0.1 to 3 phr. This is because, below an amount of 0.1 phr, the effect of the peroxide is not noteworthy, whereas, above 3 phr, the elongation at break properties and thus the strength properties of the composition are weakened. More preferentially, the amount of peroxide in the composition is within a range extending from 0.2 to 2.5 phr, preferably from 0.25 to 1.8 phr.

Regardless of the amounts of zinc diacrylate derivative and peroxide, it is important for the invention that the ratio of the peroxide content to the zinc diacrylate derivative content is greater than or equal to 0.08. Below such a content, the synergy between the zinc diacrylate derivative and the peroxide is not as effective in terms of effect on rheometry and elongation at break. Preferably, the ratio of the peroxide content to the zinc diacrylate derivative content is strictly greater than 0.09, preferably it is between 0.09 and 0.30; preferably between 0.09 and 0.20 and more preferentially between 0.09 and 0.15.

II-4 Reinforcing Filler

The composition of the tire according to the invention comprises from 5 to less than 65 phr of reinforcing filler known for its ability to reinforce a rubber composition that can be used for the manufacture of tires.

The physical state in which the reinforcing filler is provided is not important, whether it is in the form of a powder, of micropearls, of granules, of beads or any other appropriate densified form.

The reinforcing filler of the rubber composition of the tire according to the invention can comprise carbon black, an organic filler other than carbon black, an inorganic filler or the mixture of at least two of these fillers. Preferably, the reinforcing filler comprises a carbon black, a reinforcing inorganic filler or a mixture thereof. Preferably, the reinforcing inorganic filler is a silica. More preferentially still, the reinforcing filler predominantly comprises carbon black and, to a minor extent, an inorganic filler. The reinforcing filler may comprise, for example, from 50% to 100% by weight of carbon black, preferably from 55% to 90% by weight, preferably from 60% to 80% by weight. Particularly advantageously, the reinforcing filler comprises exclusively carbon black.

Such a reinforcing filler typically consists of particles, the (weight-)average size of which is less than a micrometre, generally less than 500 nm, most often between 20 and 200 nm, in particular and more preferentially between 20 and 150 nm.

According to the invention, the content of reinforcing filler, preferably the reinforcing filler predominantly comprising carbon black, can be within a range extending from 5 to 60 phr, preferably from 10 to 55 phr, preferably from 15 to 50 phr, preferably 20 to 45 phr, preferably from 35 to 40 phr.

Regardless of the amounts of zinc diacrylate derivative and filler, it is important for the invention that the ratio of the filler content to the zinc diacrylate derivative content is greater than or equal to 1.25. Preferably, the ratio of the filler content to the zinc diacrylate derivative content is within a range extending from 2 to 9, preferably from 2.5 to 7, more preferably from 3 to 5.

The blacks which can be used in the context of the present invention can be any black conventionally used in tires or their treads ("tire-grade" blacks). Among the latter, mention will be made more particularly of the reinforcing carbon blacks of the 100, 200 and 300 series, or the blacks of the 500, 600 or 700 series (ASTM grades), for instance the N115, N134, N234, N326, N330, N339, N347, N375, N550, N683 and N772 blacks. These carbon blacks may be used in isolated form, as commercially available, or in any other form, for example as support for some of the rubber additives used. The carbon blacks might, for example, be already incorporated in the diene elastomer, in particular isoprene elastomer, in the form of a masterbatch (see, for example, Applications WO 97/36724 and WO 99/16600). The BET specific surface of the carbon blacks is measured according to Standard D6556-10 [multipoint (a minimum of 5 points) method—gas: nitrogen—relative pressure $p/p_0$ range: 0.1 to 0.3].

Mention may be made, as examples of organic fillers other than carbon blacks, of functionalized polyvinyl organic fillers, such as described in applications WO 2006/069792, WO 2006/069793, WO 2008/003434 and WO 2008/003435.

The term "reinforcing inorganic filler" should be understood here as meaning any inorganic or mineral filler, whatever its colour and its origin (natural or synthetic), also known as "white" filler, "clear" filler or even "non-black" filler, in contrast to carbon black, capable of reinforcing, by itself alone, without means other than an intermediate coupling agent, a rubber composition intended for the manufacture of pneumatic tires, in other words capable of replacing, in its reinforcing role, a conventional tire-grade carbon black; such a filler is generally characterized, in a known way, by the presence of hydroxyl (—OH) groups at its surface. In other words, without a coupling agent, the inorganic filler does not make it possible to reinforce, or to sufficiently reinforce, the composition and consequently does not come within the definition of "reinforcing inorganic filler".

Mineral fillers of the siliceous type, preferentially silica ($SiO_2$), are especially suitable as reinforcing inorganic fillers. The silica used can be any reinforcing silica known to those skilled in the art, in particular any precipitated or fumed silica exhibiting a BET specific surface and also a CTAB specific surface both of less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/016387.

In the present account, as regards the silica, the BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface area is the outer surface area determined according to French Standard NF T 45-007 of November 1987 (method B).

Mineral fillers of the aluminous type, in particular alumina ($Al_2O_3$) or aluminium (oxide) hydroxides, or also reinforcing titanium oxides, for example described in U.S. Pat. Nos. 6,610,261 and 6,747,087, are also suitable as reinforcing inorganic fillers.

The physical state in which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described above.

Those skilled in the art will understand that, as filler equivalent to the reinforcing inorganic filler described in the present section, a reinforcing filler of another nature, especially organic nature, might be used provided that this reinforcing filler is covered with an inorganic layer such as silica or else comprises functional sites, especially hydroxyl sites, at its surface requiring the use of a coupling agent in order to form the bond between the filler and the elastomer. In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

A person skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

The content of coupling agent is advantageously less than 10 phr, it being understood that it is generally desirable to use as little as possible thereof. Typically, when a reinforcing inorganic filler is present, the content of coupling agent represents from 0.5% to 15% by weight, relative to the amount of inorganic filler. Its content is preferably within a range extending from 0.5 to 7.5 phr. This content is readily adjusted by those skilled in the art depending on the content of inorganic filler used in the composition.

The rubber composition of the tire in accordance with the invention can also comprise, in addition to the coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example $\alpha,\omega$-dihydroxypolyorganosiloxanes (in particular $\alpha,\omega$-dihydroxypolydimethylsiloxanes), or fatty acids, such as, for example, stearic acid.

II-5 Vulcanization System

The tire composition according to the invention does not require a vulcanization system, which is one of its advantages since this makes it possible to simplify the formulation, and the preparation of the composition. If, however, a vulcanization system is present in the composition, it is preferably present in small amounts.

The vulcanization system proper is generally based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

Molecular sulfur (or equivalently molecular sulfur-donating agents), when it is used, is in a content preferentially of less than 0.5 phr.

Thus, very preferentially, the composition does not contain molecular sulfur or sulfur-donating agent as vulcanizing agent or contains less than 0.5 phr, preferably less than 0.3 phr, more preferably less than 0.1 phr thereof. More preferably, the composition of the tire according to the invention does not contain molecular sulfur or sulfur-donating agent as vulcanizing agent.

The vulcanization system of the composition according to the invention can also comprise one or more additional accelerators, for example compounds of the family of the thiurams, zinc dithiocarbamate derivatives, sulfenamides, guanidines or thiophosphates. Use may especially be made of any compound capable of acting as accelerator of the vulcanization of diene elastomers in the presence of sulfur, in particular accelerators of the thiazoles type and also their derivatives, accelerators of thiurams type, or zinc dithiocarbamates. These accelerators are more preferentially selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and mixtures of these compounds. Preferably, use is made of a primary accelerator of the sulfenamide type.

If an accelerator is used, it is used at contents such as those used by those skilled in the art of vulcanized compositions for tires. Nevertheless, the composition of the tire according to the invention is preferentially devoid of any vulcanization accelerator.

II-6 Other Possible Additives

The rubber compositions of the tire according to the invention optionally also comprise all or a portion of the normal additives customarily used in elastomer compositions for tires, such as, for example, pigments, protective agents, such as anti-ozone waxes, chemical antiozonants or antioxidants, plasticizing agents, such as those proposed below, anti-fatigue agents, reinforcing resins, or methylene acceptors (for example novolac phenolic resin) or methylene donors (for example HMT or H3M).

According to one preferential mode, the tire composition of the invention is devoid of antioxidant.

According to one preferential mode, the tire composition of the invention is devoid of plasticizing agent. Alternatively and according to an also preferential embodiment, the composition according to the invention also comprises a plasticizing agent. Preferably, this plasticizing agent is a solid hydrocarbon-based resin (or plasticizing resin), an extender oil (or plasticizing oil) or a mixture of the two.

II-7 Tires

A subject of the present invention is also a finished or semi-finished rubber article, as well as a tire, comprising a composition according to the present invention.

The invention relates in particular to tires intended to equip motor vehicles of passenger vehicle type, SUVs ("Sport Utility Vehicles"), or two-wheel vehicles (in particular motorcycles), or aircraft, or also industrial vehicles selected from vans, heavy-duty vehicles—that is to say, underground trains, buses, heavy road transport vehicles (lorries, tractors, trailers) or off-road vehicles, such as heavy agricultural vehicles or earthmoving equipment—, and others.

It is possible to define, within the tire, three types of regions:

The radially exterior region in contact with the ambient air, this region essentially consisting of the tread and of the outer sidewall of the tire. An outer sidewall is an elastomeric layer positioned outside the carcass reinforcement with respect to the internal cavity of the tire, between the crown and the bead, so as to completely or partially cover the region of the carcass reinforcement extending from the crown to the bead.

The radially interior region in contact with the inflation gas, this region generally being composed of the layer airtight to the inflation gases, sometimes known as interior airtight layer or inner liner.

The internal region of the tire, that is to say that between the exterior and interior regions. This region includes layers or plies which are referred to here as internal layers of the tire. These are, for example, carcass plies, tread underlayers, tire belt plies or any other layer which is not in contact with the ambient air or the inflation gas of the tire.

The composition defined in the present description is particularly well suited to the internal layers and to the treads of tires.

Thus, in the tire according to the present invention, the composition may be present in the tread and/or an internal layer of the tire. According to the invention, the internal layer can be selected from the group consisting of carcass plies, crown plies, bead-wire fillings, crown feet, crown feet, decoupling layers, edge rubbers, the tread underlayer and the combinations of these internal layers. Preferably, the internal layer is selected from the group consisting of carcass plies, crown plies, bead-wire fillings, crown feet, decoupling layers and the combinations of these internal layers.

The invention relates to the tires and semi-finished products for tires described above, articles made of rubber, both in the raw state (that is to say, before curing) and in the cured state (that is to say, after crosslinking or vulcanization).

II-8 Preparation of the Rubber Compositions

The compositions are manufactured in appropriate mixers, using two successive phases of preparation which are well known to those skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking system and in particular the peroxide of the compositions according to the invention is incorporated; such phases have been described, for example, in Applications EP-A-0 501 227, EP-A-0 735 088, EP-A-0 810 258, WO00/05300 or WO00/05301.

The first (non-productive) phase is preferentially carried out in several thermomechanical steps. During a first step, the elastomers and the reinforcing fillers (and optionally the coupling agents and/or other ingredients) are introduced into an appropriate mixer, such as an ordinary internal mixer, at a temperature of between 20° C. and 100° C. and preferably between 25° C. and 100° C. After a few minutes, preferentially from 0.5 to 2 min, and a rise in the temperature to 90° C. to 100° C., the other ingredients (that is to say, those which remain, if not all were added at the start) are added all at once or in portions, with the exception of the crosslinking system and in particular of the peroxide, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the crosslinking system and in particular the peroxide is then incorporated at low temperature (typically less than 100° C.), generally in an external mixer, such as an open mill; the combined mixture is then mixed (productive phase) for a few minutes, for example between 5 and 15 min.

The final composition thus obtained is then calendered, for example in the form of a sheet or a plate, in particular for a characterization in the laboratory, or extruded, to form for example a rubber profile used for the manufacture of semi-finished products in order to obtain treads or products termed "internal layers", such as carcass ply, crown plies (or tire belt), bead-wire filling. These products can subsequently be used for the manufacture of tires, according to techniques known to those skilled in the art.

The curing is carried out in a known way at a temperature generally of between 130° C. and 200° C., under pressure, for a sufficient time which can vary, for example, between 5 and 90 min, as a function in particular of the curing temperature, of the vulcanization system adopted, of the kinetics of vulcanization of the composition under consideration or else of the size of the tire.

III—EXAMPLES

III-1 Measurements and Tests Used

Dynamic Properties (after Curing): Tensile Test

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation. The modulus used here is the nominal (or apparent) secant modulus measured in first elongation, calculated by reducing to the initial cross section of the test specimen. The nominal secant moduli (or apparent stresses, in MPa) are measured in first elongation at 50%, 100% and 300% elongation, respectively denoted M50, M100 and M300.

The tensile strengths (in MPa) and the elongations at break (EB in %) are also measured, at 23° C.±2° C., according to Standard NF T 46-002. The breaking energy is equal to the product of the elongation at break multiplied by the tensile strength.

All these tensile measurements are carried out under the standard conditions of temperature (23° C.±2° C.) and hygrometry (50%±5% relative humidity), according to French Standard NF T 40-101 (December 1979).

The dynamic properties G*(10%) and tan(δ)max at 60° C. are measured on a viscosity analyser (Metravib VA4000), according to Standard ASTM D 5992-96. The response of a sample of crosslinked composition (cylindrical test specimen with a thickness of 4 mm and a cross section of 400 mm$^2$), subjected to a simple alternating sinusoidal shear stress, at a frequency of 10 Hz, under the defined conditions of temperature, for example at 60° C., according to Standard ASTM D 1349-99 or, as the case may be, at a different temperature, is recorded. A strain amplitude sweep is carried out from 0.1% to 50% (outward cycle) and then from 50% to 1% (return cycle). The results made use of are the complex dynamic shear modulus G* and the loss factor tan(s). The maximum value of tan(s) observed, denoted tan(δ)max, and the complex dynamic shear modulus G*(10%) at 10% strain, at 60° C., are shown for the return cycle.

It is recalled that, in a manner well known to those skilled in the art, the value of tan(δ)max at 60° C. is representative of the hysteresis of the material and therefore of the rolling resistance: the lower the tan(δ)max at 60° C., the more reduced and therefore improved is the rolling resistance.

Wear Resistance

The tires are subjected to actual rolling on a road, on a specific motor vehicle, until the wear due to rolling reaches the wear indicators placed in the grooves of the tread. The result is given in base 100: according to the number of kilometres travelled, a value at 100 is set for the indicator. A value greater than that of the indicator indicates an improved result, that is to say a higher mileage travelled.

Determination of the Molar Masses: Size Exclusion Chromatography Analysis of the Copolymers a) For the copolymers which are soluble in tetrahydrofuran (THF) at ambient temperature, the molar masses were determined by size exclusion chromatography in THF. The samples were injected using a Waters 717 injector and a Waters 515 HPLC pump at a flow rate of 1 ml·min$^{-1}$ in a series of Polymer Laboratories columns. This series of columns, placed in a thermostatic chamber at 45° C., is composed of:

one PL Gel 5 μm precolumn, two PL Gel 5 μm Mixte C columns, one PL Gel 5 μm-500 Å column.

The detection was carried out using a Waters 410 refractometer. The molar masses were determined by universal calibration using polystyrene standards certified by Polymer Laboratories and a double detection with refractometer and coupling to the viscometer.

Without being an absolute method, SEC makes it possible to comprehend the distribution of the molecular weights of a polymer. On the basis of standard commercial products of polystyrene type, the various number-average weights (Mn)

and weight-average weights (Mw) can be determined and the polydispersity index calculated (PDI=Mw/Mn);

b) For the copolymers which are insoluble in tetrahydrofuran at ambient temperature, the molar masses were determined in 1,2,4-trichlorobenzene. They were first dissolved under hot conditions (4 h 00 at 150° C.), then they were injected at 150° C., with a flow rate of 1 ml·min$^{-1}$, into a Waters Alliance GPCV 2000 chromatograph equipped with three Styragel columns (two HT6E columns and one HT2 column). The detection was carried out using a Waters refractometer. The molar masses were determined by relative calibration using polystyrene standards certified by Polymer Laboratories.

Determination of the Mole Fractions

Reference is made to the article "Investigation of ethylene/butadiene microstructure copolymers by $^1$H and $^{13}$C NMR, Llauro M. F., Monnet C., Barbotin F., Monteil V., Spitz R., Boisson C., Macromolecules 2001, 34, 6304-6311", for a detailed description of the $^1$H NMR and $^{13}$C NMR techniques which have been specifically used in the present application to determine the mole fractions of the ethylene units, the conjugated diene units and of any trans-1,2-cyclohexane units.

Determination of the Crystallinity

The crystallinity measurement was carried out by comparison of the enthalpy of fusion observed in the case of EBRs. This endothermic phenomenon is observed during the analysis of the thermogram of the DSC (Differential Scanning calorimetry) measurement. The measurement is carried out by back-and-forth scanning from −150° C. to 200° C. under an inert (helium) atmosphere with a gradient of 20° C./min.

The signal corresponding to the endothermic (fusion) phenomenon is integrated and the degree of crystallinity is the ratio of the enthalpy measured to that of the perfectly crystalline polyethylene (290 J/g).

% Crystallinity=(Enthalpy measured in J/g)/(theoretical enthalpy of a 100% crystalline polyethylene in J/g).

Determination of the Glass Transition Temperature

The glass transition temperature, Tg, is measured in the present application by the DSC (Differential Scanning calorimetry) technique on a Setaram DSC 131 apparatus. The temperature program used corresponds to a temperature increase from −120° C. to 150° C. at a rate of 10° C./min. Reference may be made to the method described in application WO 2007/054224 (page 11).

III-2 Preparation of the Compositions

The tests which follow are carried out in the following way: the elastomer, the reinforcing filler, the zinc diacrylate derivative and also the various other ingredients, with the exception of the crosslinking system, are successively introduced into a blade mixer (final degree of filling: approximately 70% by volume), the initial vessel temperature of which is approximately 90° C. Thermomechanical working is then performed (non-productive phase) in one step, which lasts in total for approximately 3 to 4 min, until a maximum "dropping" temperature of 160° C. is reached.

The mixture thus obtained is recovered and cooled and then the crosslinking system (peroxide or sulfur as appropriate) is incorporated, on a mixer (homo-finisher) at 23° C. or 50° C., respectively, by mixing the whole (productive phase) in a cylinder tool for a suitable period of time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

III-3 Tests on Rubber Compositions

Seven rubber compositions were prepared, as indicated in point III-2 above, three in accordance with the invention (denoted hereinafter C1 to C3) and four not in accordance (control composition denoted hereinafter T1 to T4). Their formulations (in phr) and their properties have been summarized in Table I below.

The control composition T1 is a composition conventionally used in tire treads. The control compositions T2 and T3 differ from T1 by virtue of the nature of the elastomeric matrix and differ from the compositions in accordance with the present invention only by virtue of the nature of the crosslinking system. The control composition T4 differs from the compositions in accordance with the present invention only by virtue of the nature of the elastomeric matrix.

The results of elongation at break (% EB), tensile strength and tan(δ)max are presented in "base 100" relative to the control composition T1. For the values of elongation at break (% EB) and tensile strength, the higher the value, the more the result is improved. Moreover, the lower the value of tan(δ)max at 60° C. base 100, the lower will be the hysteresis of the composition and thus the more its rolling resistance will be improved.

TABLE I

|  | T1 | T2 | T3 | T4 | C1 | C2 | C3 |
|---|---|---|---|---|---|---|---|
| NR (1) | 75 | — | — | 75 | — | — | — |
| BR (2) | 25 | — | — | 25 | — | — | — |
| EBR (3) | — | 100 | 100 | — | 100 | 100 | 100 |
| N234 (4) | 52 | 52 | 40 | 45 | 45 | 37 | 30 |
| Sulfur | 1 | 1 | 1 | — | — | — | — |
| CBS (5) | 1 | 1 | 1 | — | — | — | — |
| ZnO (6) | 2.5 | 2.5 | 2.5 | — | — | — | — |
| Stearic acid (7) | 1.5 | 1.5 | 1.5 | — | — | — | — |
| 6PPD (8) | 2 | 2 | 2 | — | — | — | — |
| ZDMA (9) | — | — | — | 10 | 10 | 10 | 10 |
| DICUP (10) | — | — | — | 1 | 1 | 1 | 1 |
| % EB | 100 | 140 | 143 | 154 | 111 | 169 | 143 |
| Tensile strength | 100 | 95 | 82 | 100 | 136 | 141 | 136 |
| Tan(δ) max 60° C. | 100 | 120 | 100 | 100 | 75 | 60 | 50 |

(1) Natural rubber
(2) Polybutadiene (Nd) with 0.7% of 1,2; 1.7% of trans 1,4; 98% of cis 1,4 (Tg = −105° C.) (Buna CB24 from the company Arlanxeo)
(3) Ethylene-butadiene copolymer with 80 mol % of ethylene units prepared according to a process for the polymerization of ethylene and butadiene according to Example 4-2 of patent EP 1 954 705 B1 in the name of the Applicants, the polymerization time being adjusted so as to obtain a molar mass Mn = 153 000 g/mol with a polydispersity index equal to 1.9
(4) Carbon black N234 (name according to Standard ASTM D-1765)
(5) N-Cyclohexyl-2-benzothiazolesulfenamide (Santocure CBS from Flexsys)
(6) Zinc oxide (industrial grade - Umicore)
(7) Stearin (Pristerene 4931 from Uniqema)
(8) N-(1,3-dimethylbutyl)-N-phenyl-para-phenylenediamine (Santoflex 6-PPD from Flexsys)
(9) Zinc dimethacrylate (Dimalink 634 from the company Cray Valley)
(10) Dicumyl peroxide (Dicup from the company Hercules)

These results show that the compositions in accordance with the present invention, having both an elastomeric matrix based on a copolymer comprising ethylene units and conjugated diene units, and a crosslinking system based on a zinc diacrylate derivative and peroxide, make it possible to improve the rolling resistance as well as the cohesion properties of the material. Moreover, it has been found that when the compositions in accordance with the present invention comprise a reinforcing filler in a content of between 35 and 40 phr, the elongation at break performance is also improved.

III-4 Tire Tests

The control compositions T and compositions according to the invention P1 and P2, described in Table II below, are used in this test as treads of passenger vehicle tires with radial carcass, of size 205/55 R16, conventionally manufactured and in all respects identical except for the constitutive rubber composition of the tread.

The control composition T is a composition conventionally used in tire treads.

The tires were first machine tested to determine their rolling resistance (Tan(δ) return 60° C.) and (G*10%) drift thrust, and then mounted on the vehicle for the further tests.

The tires were then subjected to running on a road, on a BMW 320D 163CV COMFORT 4-passenger load for the determination of wear resistance.

The results of drift thrust, wear performance and tan(δ) return are presented in base 100 relative to the control tire T. For the drift thrust and wear performance values, the higher the value, the more improved the result is. Moreover, the lower the value of tan(δ)return at 60° C. base 100, the lower will be the hysteresis of the composition and thus the more its rolling resistance will be improved.

TABLE II

|  | T | P1 | P2 |
|---|---|---|---|
| NR (1) | 80 |  |  |
| BR (2) | 20 |  |  |
| EBR (3) |  | 100 | 100 |
| N234 (4) | 54 | 37 | 45 |
| Sulfur | 3 |  |  |
| CBS (5) | 2 |  |  |
| ZnO (6) | 2 |  |  |
| Stearic acid (7) | 1.1 |  |  |
| 6PPD (8) | 1.1 |  |  |
| ZDMA (9) |  | 10 | 5 |
| DICUP (10) |  | 1 | 0.5 |
| G * 10% 60° C. | 100 | 136 | 145 |
| Tan(δ) return 60° C. | 100 | 70 | 95 |
| Wear performance | 100 | 240 | 220 |

(1) to (10) as defined for Table I

These results show that the compositions according to the present invention used in the tire tread make it possible to improve both the drift thrust and thus the vehicle behaviour, the rolling resistance, and also the wear performance.

The invention claimed is:

1. A tire comprising a rubber composition based on at least:
    an elastomeric matrix comprising predominantly a random copolymer comprising ethylene units and conjugated diene units, the mole fraction of the ethylene units in the copolymer being within a range extending from 50% to 95%;
    a peroxide; and
    a zinc diacrylate derivative in the form of a zinc salt of formula (I)

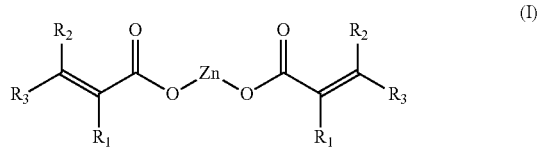

in which $R_1$, $R_2$ and $R_3$ represent independently of one another a hydrogen atom or a $C_1$-$C_7$ hydrocarbon-based group selected from linear, branched or cyclic alkyl groups, aralkyl groups, alkylaryl groups and aryl groups, and optionally interrupted by one or more heteroatoms, $R_2$ and $R_3$ possibly together forming a non-aromatic ring,
    wherein contents of zinc diacrylate derivative and of peroxide are such that a ratio of peroxide content to zinc diacrylate derivative content is greater than or equal to 0.08,
    wherein the composition comprises from 5 to less than 65 parts by weight per hundred parts by weight of elastomer, phr, of reinforcing filler, and
    wherein a ratio of filler content to the content of zinc diacrylate derivative is greater than or equal to 1.25.

2. The tire according to claim 1, wherein the conjugated diene units are selected from the group consisting of butadiene units, isoprene units and mixtures thereof.

3. The tire according to claim 1, wherein the conjugated diene units are butadiene units.

4. The tire according to claim 1, wherein the random copolymer comprising ethylene units and conjugated diene units has a glass transition temperature Tg which is less than 25° C.

5. The tire according to claim 1, wherein $R_1$, $R_2$ and $R_3$ independently represent a hydrogen atom or a methyl group.

6. The tire according to claim 1, wherein $R_2$ and $R_3$ each represent a hydrogen atom.

7. The tire according to claim 1, wherein $R_1$ represents a methyl group.

8. The tire according to claim 1, wherein the content of zinc diacrylate derivative in the composition is within a range extending from 5 to 40 phr.

9. The tire according to claim 1, wherein the peroxide in the composition is an organic peroxide.

10. The tire according to claim 9, wherein the organic peroxide is selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane, n-butyl-4,4'-di(tert-butylperoxy) valerate, OO-(t-butyl)-O-(2-ethylhexyl) monoperoxycarbonate, tert-butyl peroxyisopropylcarbonate, tert-butyl peroxybenzoate, tert-butyl peroxy-3,5,5-trimethylhexanoate, 1,3(4)-bis(tert-butylperoxyisopropyl)benzene, and mixtures thereof.

11. The tire according to claim 1, wherein the content of peroxide in the composition is within a range extending from 0.1 to 3 phr.

12. The tire according to claim 1, wherein the ratio of peroxide content to zinc diacrylate derivative content is between 0.09 and 0.30.

13. The tire according to claim 1, wherein the content of reinforcing filler is within a range extending from 5 to 60 phr.

14. The tire according to claim 1, wherein the reinforcing filler comprises a carbon black, a reinforcing inorganic filler or a mixture thereof.

15. The tire according to claim 14, wherein the reinforcing filler predominantly comprises carbon black.

16. The tire according to claim 1, wherein the ratio of the filler content to the zinc diacrylate derivative content is within a range extending from 2 to 9.

17. The tire according to claim 1, wherein the composition does not contain molecular sulfur or a sulfur-donating agent as vulcanizing agent or contains less than 0.5 phr thereof.

18. The tire according to claim 1, wherein the composition is present in a tread, in at least one internal layer of the tire, or in both the tread and at least one internal layer of the tire.

19. The tire according to claim 18, wherein the at least one internal layer is selected from the group consisting of carcass plies, crown plies, bead-wire fillings, crown feet, decoupling layers, edge rubbers, tread underlayer and combinations thereof.

\* \* \* \* \*